United States Patent
Hisano et al.

(10) Patent No.: US 10,686,545 B2
(45) Date of Patent: Jun. 16, 2020

(54) OPTICAL TRANSMISSION SYSTEM AND WAVELENGTH ALLOCATION METHOD

(71) Applicant: NIPPON TELEGRAPH AND TELEPHONE CORPORATION, Tokyo (JP)

(72) Inventors: Daisuke Hisano, Yokosuka (JP); Tatsuya Shimada, Yokosuka (JP); Jun Terada, Yokosuka (JP); Hiroshi Ou, Yokosuka (JP); Hiroko Nomura, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/336,020

(22) PCT Filed: Sep. 27, 2017

(86) PCT No.: PCT/JP2017/034978
§ 371 (c)(1),
(2) Date: Mar. 22, 2019

(87) PCT Pub. No.: WO2018/062281
PCT Pub. Date: Apr. 5, 2018

(65) Prior Publication Data
US 2019/0372698 A1    Dec. 5, 2019

(30) Foreign Application Priority Data
Sep. 28, 2016  (JP) .................. 2016-189677

(51) Int. Cl.
*H04B 10/00*  (2013.01)
*H04J 14/02*  (2006.01)
*H04B 10/2575*  (2013.01)

(52) U.S. Cl.
CPC .... *H04J 14/0249* (2013.01); *H04B 10/25752* (2013.01)

(58) Field of Classification Search
USPC .................................................. 398/115–117
See application file for complete search history.

(56) References Cited

U.S. PATENT DOCUMENTS 5,978,117 A * 11/1999 Koonen ........... H04B 10/25752
                                                398/116
6,674,966 B1 * 1/2004 Koonen ........... H04B 10/25752
                                                370/318
(Continued)

FOREIGN PATENT DOCUMENTS

EP    0994582 A1    4/2000
EP    2309666 A2    4/2011
(Continued)

OTHER PUBLICATIONS

H. Yasuda et al., Realization Method of Moving Cell for 5G Future Radio Access Network, IEICE Technical Report, RCS2014-3, Apr. 2014 (with partial translation).
(Continued)

*Primary Examiner* — Agustin Bello

(57) ABSTRACT

An optical transmission system of an embodiment connects a plurality of wireless communication systems to each other, and includes a wavelength allocation unit that allocates different wavelengths to optical-terminating devices to which the wireless communication systems next to each other are connected, on the basis of the physical arrangement of each of the plurality of wireless communication system.

9 Claims, 9 Drawing Sheets

(56) References Cited

U.S. PATENT DOCUMENTS

| | | | | |
|---|---|---|---|---|
| 6,895,185 B1* | 5/2005 | Chung | ................ | H04B 10/272 398/115 |
| 7,295,777 B1* | 11/2007 | Britz | ................ | H04B 10/1125 379/56.2 |
| 7,409,159 B2* | 8/2008 | Izadpanah | .......... | H04B 10/1149 379/56.1 |
| 8,027,589 B2* | 9/2011 | Song | ................ | H04B 10/25758 398/115 |
| 8,897,648 B2* | 11/2014 | Cvijetic | ........... | H04B 10/25753 398/115 |
| 9,197,353 B2* | 11/2015 | Lee | ................ | H04J 14/0252 |
| 9,247,543 B2* | 1/2016 | Berlin | ............... | H04W 72/0453 |
| 9,369,222 B2* | 6/2016 | Berlin | ................... | H04B 7/155 |
| 9,602,212 B2* | 3/2017 | Kuwano | ............ | H04L 12/2861 |
| 9,813,127 B2* | 11/2017 | George | ................ | H04B 7/0413 |
| 10,128,951 B2* | 11/2018 | Casterline | ........ | H04B 10/25754 |
| 2003/0016418 A1* | 1/2003 | Westbrook | ....... | H04B 10/25758 398/115 |
| 2007/0133986 A1* | 6/2007 | Lee | ................ | H04J 14/0282 398/58 |
| 2011/0069957 A1* | 3/2011 | Kim | ................ | H04B 3/542 398/75 |
| 2012/0308237 A1* | 12/2012 | Mutalik | ........... | H04B 10/25751 398/116 |
| 2014/0153928 A1* | 6/2014 | Yu | ................ | H04B 10/1129 398/115 |
| 2014/0270779 A1* | 9/2014 | Lee | ................ | H04J 14/025 398/79 |
| 2015/0139658 A1* | 5/2015 | Olsson | ................ | H04L 1/0003 398/115 |
| 2015/0311980 A1 | 10/2015 | Kuwano et al. | | |
| 2016/0080083 A1* | 3/2016 | Mutalik | ........... | H04B 10/25751 398/115 |

FOREIGN PATENT DOCUMENTS

| | | |
|---|---|---|
| EP | 2475121 A1 | 7/2012 |
| JP | 2013534122 A | 8/2013 |
| JP | 2014-165614 A | 9/2014 |
| JP | 2015-076672 A | 4/2015 |
| WO | WO-2010106917 A1 | 9/2010 |
| WO | WO-2014/077168 A1 | 5/2014 |

OTHER PUBLICATIONS

T. Tashiro et al., "A Novel DBA Scheme for Tdm-Pon based Mobile Fronthaul," Proc. OFC2014, Tu3F.3, Mar. 2014.

K. Honda et al., "WDM Passive Optical Network Managed with Embedded Pilot Tone for Mobile Fronthaul," Proc. ECOC2015, We. 3. 4. 4., Sep. 2015.

Y. Senoo et al., Proposal of DBA-cycle independent hitless λ-tuning sequence in λ-tunable WDM/TDM-PON, IEICE General Conference, B-8-47, Mar. 2016 (with partial translation).

3rd Generation Partnership Project; Technical Specification Group Radio Access Network; Small cell enhancements for E-UTRA and E-UTRAN-Physical layer aspects (Release 12), 3GPP TR 36.872 v12.1.0, 3GPP [online], Dec. 2013, pp. 24-25, [search date Nov. 15, 2017], internet <URL:http://www.3gpp.org/ftp//Specs/archive/36_series/36.872/36872-c10.zip>.

International Search Report (Japanese and English) issued in International Application No. PCT/JP2017/034978, dated Nov. 28, 2017; ISA/JP.

Japanese Office Action regarding JPSN 2018542649, dated Aug. 27, 2019.

Kim, Youngjun et al., "Scalable Wireless-Optical Broadband Access Network Using Reconfigurable Optical Backhaul and Gateway Selection Method", The 12th International Conference on Optical Internet Proceedings, IEEE, Aug. 27. 2014, pp. 1-2, XP032678049, DOI: 10.1109/COIN.2014.6950623 [retrieved on Nov. 7, 2014].

Dat, Pham Tien et al., "WDM RoF-MMW and Linearly Located Distributed Antenna System for Future High-Speed Railway Communications", IEEE Communications Magazine, IEEE Service Center, Piscataway, US, vol. 53, No. 10, Oct. 1, 2015, pp. 86-94, XP011586396, ISSN: 0163-6804, DOI: 10.1109/MCOM.2015. 7295468 [retrieved on Oct. 8, 2015].

Extended European Search Report from counterpart EP178562302, dated Mar. 30, 2020.

* cited by examiner

OPTICAL TRANSMISSION SYSTEM AND WAVELENGTH ALLOCATION METHOD

CROSS-REFERENCE TO RELATED APPLICATIONS

This application is a 371 U.S. National Stage of International Application No. PCT/JP2017/034978, filed on Sep. 27, 2017, which claims priority to Japanese Application No. 2016-189677, filed on Sep. 28, 2016. The entire disclosures of the above applications are incorporated herein by reference.

TECHNICAL FIELD

The present invention relates to an optical transmission system and a wavelength allocation method.

BACKGROUND ART

In current mobile networks, a wireless base station which is statically installed on the ground performs communication with mobile wireless terminals typified by cellular phones or a smartphones. On the other hand, it has been examined that a mobile network includes a wireless base station installed on a moving object such as a train or a bus, wherein the wireless base station (hereinafter, referred to as an "on-vehicle station") integrates communication of mobile wireless terminals, and the on-vehicle station performs communication with a wireless base station (hereinafter, referred to as a "ground station") installed on the ground (see, for example, Non-Patent Literature 1). Generally, a moving object such as a train or a bus having an on-vehicle station mounted thereon moves at higher speed than pedestrians. For this reason, hereinafter, a moving object such as a train or a bus is defined as a high-speed moving object and is thus distinguished from a low-speed moving object such as a pedestrian.

FIG. 7 is a schematic diagram illustrating a specific example of a mobile network in the related art. FIG. 7 shows a mobile network in which communication between communication devices 11-1 to 11-3 belonging to a higher-level network 10 and an on-vehicle station 1 is relayed by ground stations 2-1 to 2-3 and a higher-level device 3. FIG. 7 shows a state in which communication of the on-vehicle station 1 during its movement in a traveling direction is relayed to the higher-level network 10 side by the ground station 2-1 and the higher-level device 3. The on-vehicle station 1 belongs to a wireless communication range 21 (hereinafter, referred to as a "cell") which is managed by the ground station 2-1. Cells 21, 22 and 23 covering the course of the on-vehicle station 1 are adjacently present in the traveling direction of the on-vehicle station 1. The on-vehicle station 1 can maintain communication with the higher-level network 10 side by switching cells to which it belongs with its movement in the traveling direction. Hereinafter, in a case where the ground stations 2-1 to 2-3 are not required to be particularly distinguished from each other, the ground stations 2-1 to 2-3 are generally described as the ground station 2.

The number of optical fibers, which are required to be constructed for connecting each ground station 2 to the higher-level device 3, must be the same as the number of ground stations 2 installed. For this reason, high costs are incurred in order to form cells such as those in which all the courses of the on-vehicle station 1 are covered. In addition, the transmission bandwidth of an optical fiber between each ground station 2 and the higher-level device 3 is used only when the on-vehicle station 1 is present in a corresponding cell of each ground station 2. As shown in FIG. 7, since the on-vehicle station 1 moves while switching cells to which it belongs, the bandwidth utilization efficiency of optical fibers is not high, and an improvement in cost effectiveness is required.

Regarding such a problem, a technique is proposed to improve the bandwidth utilization efficiency of an optical network connecting each of the ground stations 2 and the higher-level device 3 to each other by sharing the optical network among the ground stations 2 and to reduce the costs for laying the optical fibers. As a representative method, a method has been proposed for realizing a mobile network using a PON system obtained by extending a time division multiplexer-passive optical network (TDM-PON) and a wavelength division multiplexing-passive optical network (WDM-PON), which are widely introduced for mass users, or a PON system obtained by integrating a TDM-PON and a WDM-PON (see, for example, Patent Literature 1 and Non-Patent Literature 2 and 3).

FIG. 8 is a schematic diagram illustrating a specific example of a mobile network constituted by an extended PON system. FIG. 8 shows a mobile network in which an optical transmission line between each ground station 2 and a higher-level device 3 is realized in a PON system. The PON system shown in FIG. 8 includes optical network units (ONUs) (optical-terminating devices) 7-1 to 7-3 that connect ground stations 2-1 to 2-3 to the PON system, an optical coupler 8 that integrates the ONUs 7-1 to 7-3, and an optical line terminal (OLT) (optical terminal station device) 9 that connects the higher-level device 3 to the PON system. The OLT 9 communicates with the ONUs 7-1 to 7-3 through the optical coupler 8. In the mobile network configured in this manner, a portion of an optical fiber between the ground stations 2 and the higher-level device 3 can be shared by a plurality of cells. Hereinafter, in a case where the ONUs 7-1 to 7-3 are not required to be particularly distinguished from each other, the ONUs 7-1 to 7-3 are generally described as the ONU 7.

CITATION LIST

Patent Literature

Patent Literature 1

PCT International Publication No. WO 2014/077168

Non-Patent Literature

Non-Patent Literature 1

Hiroto Yasuda, Yasufumi Morioka, Yoshifumi Morihiro, Satoshi Suyama, Jiyun Shen, and Yukihiko Okumura, "Realization Method of Moving Cell for 5G Future Radio Access Network", IEICE Technical Report, RCS2014-3, April, 2014

Non-Patent Literature 2

T. Tashiro, S. Kuwano, J. Terada, T. Kawamura, N. Tanaka, S. Shigematsu, and N. Yoshimoto, "A Novel DBA Scheme for TDM-PON based Mobile Fronthaul", Proc. OFC 2014, Tu3F.3, March 2014.

Non-Patent Literature 3

K. Honda, T. Kobayashi, T. Shimada, J. Terada, and A. Otaka, "WDM Passive Optical Network Managed with Embedded Pilot Tone for Mobile Fronthaul", Proc. ECOC 2015, We. 3. 4. 4., September 2015

Non-Patent Literature 4

Yumiko Senoo, Shin Kaneko, Kota Asaka, Ken-Ichi Suzuki, Akihiro Otaka, "Proposal of DBA-cycle independent hitless λ-tuning sequence in λ-tunable WDM/TDM-PON", IEICE General Conference, B-8-47, March 2016

SUMMARY OF INVENTION

Technical Problem

However, the plurality of ground stations 2 and the higher-level device 3 are connected to each other in the WDM-PON, a wavelength of an optical signal which is used by the ONU 7 is allocated to the ONU 7 connected to the respective ground station 2 without regard to the position of the ground station 2.

FIG. 9 is a diagram illustrating a specific example of a wavelength allocation result with respect to each ONU 7 corresponding to a respective cell in a mobile network in which the plurality of ground stations 2 and the higher-level device 3 are connected to each other through a WDM-PON. The example in FIG. 9 shows that wavelengths of $\lambda_1$ to $\lambda_4$ are allocated to ONUs 7-11 to 7-18 adjacent to each other in the traveling direction of a high-speed moving object. As shown in the example of FIG. 8, in a case where the plurality of ground stations 2 and the higher-level device 3 are connected to each other through a WDM-PON, there is the possibility of the same wavelength being allocated to adjacent ONUs 7 as in the ONUs 7-12 and 7-13 or the ONUs 7-17 and 7-18. In a case where such wavelength allocation is performed, there is the possibility of a decrease in the throughput of optical communication. In a situation where a high-speed moving object is present in cells 20-12 and cell 20-13 as shown in FIG. 9, traffic concentrates only on optical communication of a wavelength $\lambda_2$ in spite of wavelengths other than $\lambda_2$ being unused because the bandwidth of the wavelength $\lambda_2$ is shared by two cells 20-12 and cell 20-13. Therefore, there is the possibility of a decrease in throughput.

In view of such circumstances, an object of the present invention is to provide a technique that makes it possible to suppress a decrease in throughput in an optical communication system that relays communication of a moving wireless terminal station.

Solution to Problem

According to a first aspect of the present invention, there is provided an optical transmission system, which connects a plurality of wireless communication systems to each other, including a wavelength allocation unit that allocates different wavelengths to optical-terminating devices to which the wireless communication systems next to each other are connected, on the basis of a physical arrangement of each of the plurality of wireless communication systems.

According to a second aspect of the present invention, the optical transmission system in the first aspect further includes: a traffic monitoring unit that acquires traffic information relating to traffic of each of the plurality of wireless communication systems; a connection order acquisition unit that estimates a physical arrangement of the optical-terminating devices on the basis of the traffic information; a connection number information acquisition unit that acquires connection number information indicating the number of optical-terminating devices connected to the wireless communication systems; and a wavelength information storage unit that stores wavelength information indicating information of a wavelength allocated to each of the optical-terminating devices which is connected to a respective one of the plurality of wireless communication systems.

According to a third aspect of the present invention, the optical transmission system in the second aspect further includes a registration unit that registers arrangement information indicating the physical arrangement of the optical-terminating devices estimated by the connection order acquisition unit with an optical terminal station device included in the optical transmission system.

According to a fourth aspect of the present invention, in the optical transmission system of the second or third aspect, the connection order acquisition unit estimates the physical arrangement of the optical-terminating devices on the basis of a distance between the optical terminal station device and each of the optical-terminating devices.

According to a fifth aspect of the present invention, in the optical transmission system of any one of the first to fourth aspects, the wavelength allocation unit estimates one optical-terminating device of the optical-terminating devices, which does not generate traffic, on the basis of traffic information of a terminal device that moves among the plurality of wireless communication systems and makes the estimated one optical-terminating device transition to a stopped state.

According to a sixth aspect of the present invention, in the optical transmission system of any one of the first to fourth aspects, the wavelength allocation unit allocates, to one of the optical-terminating devices, a wavelength which is next longest or shortest after a wavelength currently allocated to another one of optical-terminating devices adjacent to the one among wavelengths capable of being allocated to the optical-terminating devices.

According to a seventh aspect of the present invention, there is provided a wavelength allocation method, which is performed by an optical transmission system connecting a plurality of wireless communication systems to each other, including a step of allocating different wavelengths to optical-terminating devices to which the wireless communication systems next to each other are connected, on the basis of a physical arrangement of each of the plurality of wireless communication systems.

Advantageous Effects of Invention

According to the present invention, it is possible to suppress a decrease in throughput in an optical communication system that relays communication of a moving wireless terminal station.

DESCRIPTION OF EMBODIMENTS

First Embodiment

Figure 1:
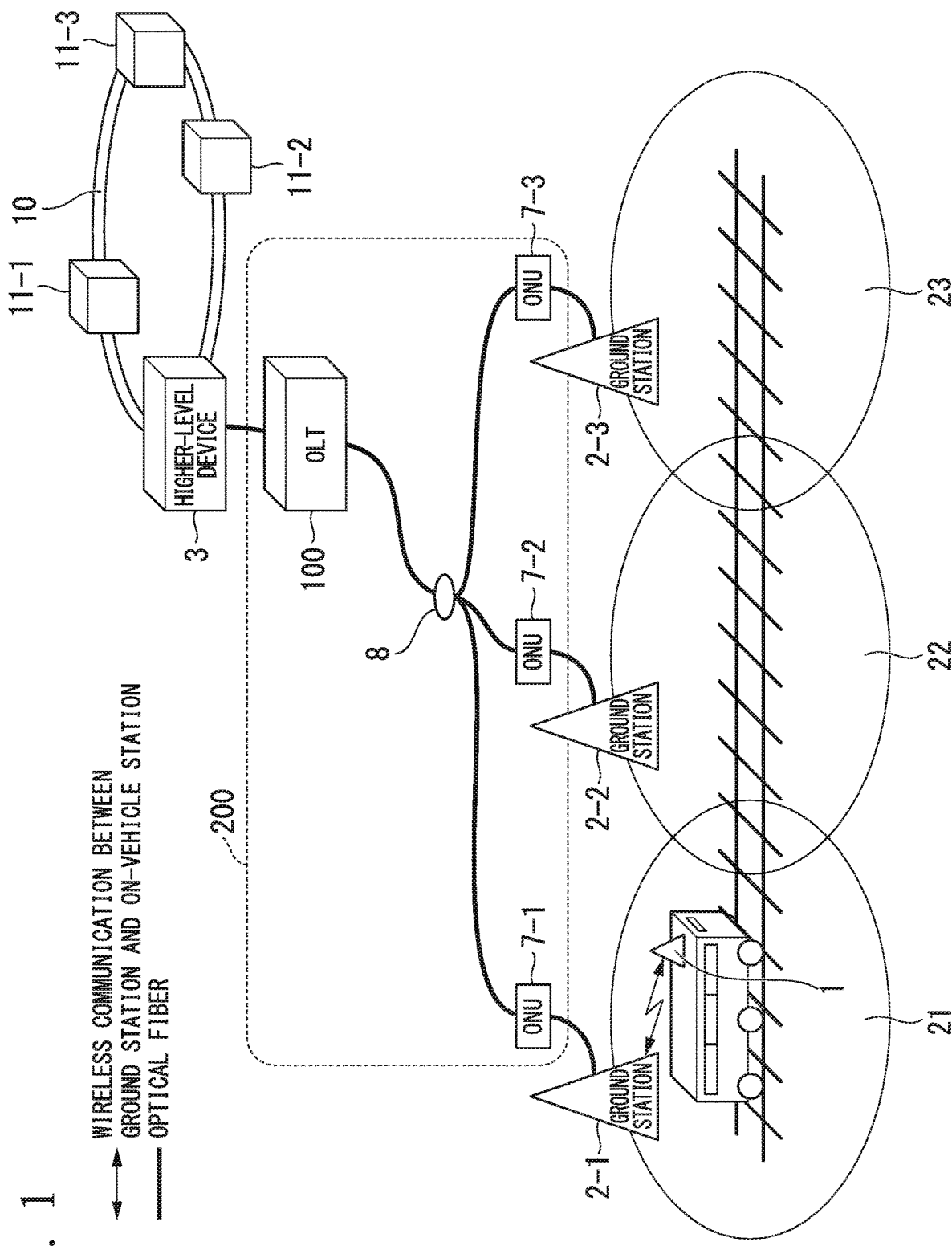
FIG. 1 is a diagram illustrating a specific example of a mobile network constituted by a PON system of a first embodiment.

FIG. 1 is a diagram illustrating a specific example of a mobile network (an example of a wireless communication system) constituted by a PON system 200 (an example of an optical transmission system) of a first embodiment. The PON system 200 includes an OLT 100 (optical terminal station device), ONUs 7 (optical-terminating device) and an optical coupler 8. The ONUs 7 and the optical coupler 8 are similar to those of the related art.

Figure 2:
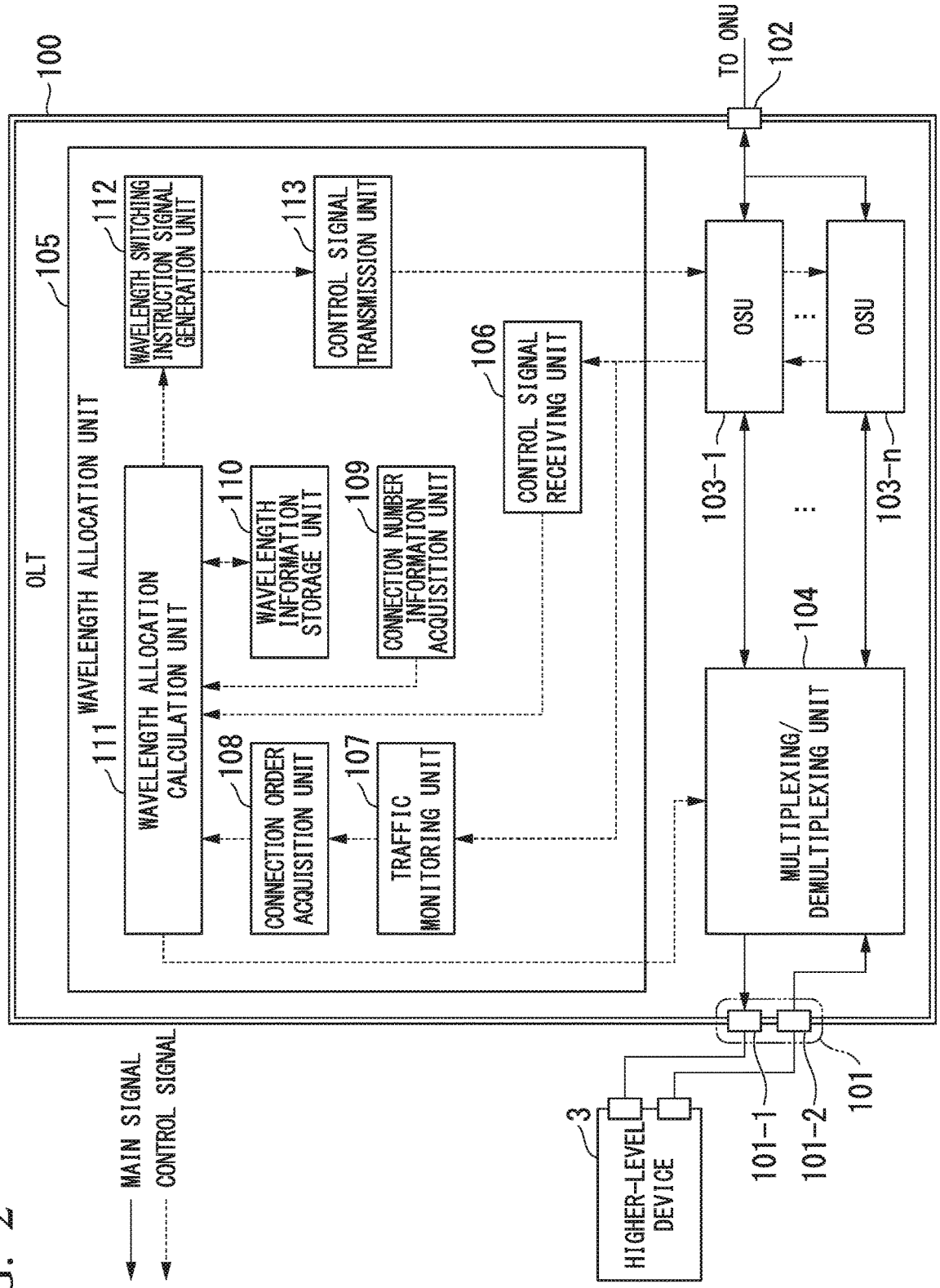
FIG. 2 is a block diagram illustrating a specific example of a functional configuration of an OLT of the first embodiment.

FIG. 2 is a block diagram illustrating a specific example of a functional configuration of the OLT 100. The OLT 100 includes a central processing unit (CPU), a memory, an auxiliary storage device and the like connected to each other through a bus, and executes a program. The OLT 100 executes the program to thereby function as a device including a first input and output unit 101, a second input and output unit 102, an optical subscriber unit (OSU) 103, a multiplexing/demultiplexing unit 104 and a wavelength allocation unit 105. All or some of respective functions of the OLT 100 may be realized using hardware such as an application specific integrated circuit (ASIC), a programmable logic device (PLD), a field programmable gate array (FPGA), or the like. The program may be recorded in a computer readable recording medium. The computer readable recording medium refers to, for example, a portable medium such as a flexible disk, a magneto-optic disc, a ROM or a CD-ROM, or a storage device such as a hard disk built into a computer system. The program may be transmitted through an electrical telecommunication line.

The first input and output unit 101 inputs and outputs communication signals to and from the higher-level device 3. Specifically, a first input and output unit 101-1 outputs a transmission signal, and a first input and output unit 101-2 inputs a reception signal. Communication between the OLT 100 and the higher-level device 3 may be optical communication through an optical fiber, and may be other cable communication through a metal cable or the like.

The second input and output unit 102 inputs and outputs optical signals to and from the optical coupler 8 through an optical fiber. The second input and output unit 102 multiplexes and outputs an optical signal having a different wavelength for each ONU 7. The second input and output unit 102 outputs an optical signal, which is output from the optical coupler 8, to each of OSUs 103-1 to 103-$n$. Here, n is an integer equal to or greater than 1 and represents the number of ONUs 7 with which the OLT 100 communicates. The OLT 100 may include n or more OSUs.

Each of the OSUs 103-1 to 103-$n$ transmits and receives an optical signal having a different wavelength. Specifically, the OSU 103-$i$ ($1 < i < n$) separates an optical signal having a wavelength corresponding to its own from an optical signal which is output from the second input and output unit 102. The OSU 103-$i$ converts the separated optical signal into an electrical signal and outputs the converted signal to the multiplexing/demultiplexing unit 104. Hereinafter, in a case where the OSUs 103-1 to 103-$n$ are not required to be particularly distinguished from each other, the OSUs 103-1 to 103-$n$ are generally described as the OSU 103.

An optical signal that is received by each OSU 103 includes control information required for the allocation of a wavelength to each ONU 7. For example, the control information may include information such as a λ-tuning gate signal which is a control signal of wavelength allocation (see, for example, Non-Patent Literature 4). Each OSU 103 outputs the control information included in a reception signal to the wavelength allocation unit 105.

The multiplexing/demultiplexing unit 104 multiplexes or demultiplexes a signal between the higher-level device 3 and the OSUs 103. Specifically, the higher-level device 3 multiplexes transmission signals to a plurality of ONUs 7 and transmits the multiplexed signal to the OLT 100. Therefore, the multiplexing/demultiplexing unit 104 separates the transmission signal from the higher-level device 3 received through the first input and output unit 101 into a transmission signal for each individual ONU 7 which is its destination. The multiplexing/demultiplexing unit 104 outputs each of the separated individual transmission signals to the OSU 103 associated with each ONU 7. In addition, the multiplexing/demultiplexing unit 104 multiplexes the electrical signal which is output from each OSU 103, and performs switching in accordance with the destination of the multiplexed individual electrical signals. The term "switching" as used herein means a process of relaying received data on the basis of destination information. The switching may be realized by relay processing (switching) in a layer 2, and may be realized by relay processing (routing) in a layer 3. The multiplexing/demultiplexing unit 104 performs switching in a downlink direction by identifying the destination of the transmission signal on the basis of wavelength information which is output from the wavelength allocation unit 105.

The wavelength allocation unit 105 allocates a wavelength of an optical signal which is used in communication with the OLT to the individual ONUs 7. The wavelength allocation unit 105 includes a control signal receiving unit 106, a traffic monitoring unit 107, a connection order acquisition unit 108, a connection number information acquisition unit 109, a wavelength information storage unit 110, a wavelength allocation calculation unit 111, a wavelength switching instruction signal generation unit 112 and a control signal transmission unit 113.

The control signal receiving unit 106 acquires control information from each OSU 103. The control signal receiving unit 106 outputs the acquired control information to the wavelength allocation calculation unit 111.

The traffic monitoring unit 107 acquires control information from each OSU 103. The traffic monitoring unit 107 monitors the traffic of each ONU 7 on the basis of the acquired control information. Specifically, the traffic monitoring unit 107 has a function of counting the traffic amount (an example of traffic information) of uplink communication or downlink communication of an on-vehicle station 1 (terminal device) mounted in a high-speed moving object moving among cells for each ONU 7. The traffic monitoring unit 107 generates information (hereinafter, referred to as "arrangement information") relating to the physical arrangement of the ONUs 7 on the basis of the traffic of each ONU 7. The traffic monitoring unit 107 outputs the generated arrangement information to the connection order acquisition unit 108. That is, the traffic monitoring unit 107 specifies the transitions of data traffic occurring in cells through which a high-speed moving object passes. The arrangement information indicates the transition of data traffic of each ONU 7 based on the arrangement of cells of ground stations 2 connected to the respective ONUs 7 and the movement path of a high-speed moving object. The cell represents a wireless communication range which is managed by each ground station 2, and represents a region in which the ground station 2 and the on-vehicle station 1 can perform wireless communication.

The connection order acquisition unit 108 generates connection order information indicating the connection order of each ONU 7 on the basis of arrangement information which is output from the traffic monitoring unit 107. The connection order acquisition unit 108 outputs the generated connection order information to the wavelength allocation calculation unit 111. The connection order acquisition unit 108 may specify the order of cells through which a high-speed moving object passes during its movement on the basis of the arrangement information, and determine the order of the ONUs 7 on the basis of the order of the specified cells. The order of the ONUs 7 may be set to an order in which data traffic is generated in an ONU 7 connected to the ground station 2 having a cell through which the high-speed moving object (on-vehicle station 1) passes. The connection order acquisition unit 108 may output information indicating the determined order of the ONUs 7 as the connection order information to the wavelength allocation calculation unit 111. The arrangement information may be stored in advance in a storage area inside the OLT 100. In this case, the connection order acquisition unit 108 can acquire the arrangement information by accessing this storage area inside the OLT 100. The arrangement information may be acquired through a network or a recording medium. In this case, the OLT 100 may include an arrangement information acquisition unit (an example of a registration unit) that acquires arrangement information through a network or a recording medium. In this case, the arrangement information acquisition unit stores the arrangement information acquired through a network or a recording medium in the storage area inside the OLT 100.

The connection number information acquisition unit 109 acquires connection number information indicating the number of ONUs connected to ground stations 2. The connection number information is stored in advance in the internal storage area included in the OLT 100.

The wavelength information storage unit 110 is configured using a storage device such as a magnetic hard disk device or a semiconductor storage device. The wavelength information storage unit 110 stores wavelength information. The wavelength information indicates a correspondence relationship between each ONU 7 and a wavelength allocated to each ONU 7.

The wavelength allocation calculation unit 111 performs wavelength allocation calculation for each ONU 7 on the basis of connection order information which is acquired from the connection order acquisition unit 108, a control signal which is output from the control signal receiving unit 106, connection number information which is output from the connection number information acquisition unit 109, and wavelength information which is acquired from the wavelength information storage unit 110. The wavelength allocation calculation unit 111 generates new wavelength information through wavelength allocation calculation. The wavelength allocation calculation unit 111 updates the wavelength information stored in the wavelength information storage unit 110 with the generated new wavelength information. In addition, the wavelength allocation calculation unit 111 outputs the generated wavelength information to the multiplexing/demultiplexing unit 104 and the wavelength switching instruction signal generation unit 112.

The wavelength switching instruction signal generation unit 112 generates a wavelength switching instruction signal for instructing a corresponding ONU 7 to perform switching to a wavelength indicated by the wavelength information on the basis of the wavelength information which is output from the wavelength allocation calculation unit 111. The wavelength switching instruction signal generation unit 112 outputs the generated wavelength switching instruction signal to the control signal transmission unit 113.

The control signal transmission unit 113 transmits the wavelength switching instruction signal which is output from the wavelength switching instruction signal generation unit 112 to an OSU 103 which is a target that gives an instruction for switching of a wavelength. Each ONU 103 having received the wavelength switching instruction signal switches a wavelength which is set for itself to a wavelength indicated by the wavelength switching instruction signal, and instructs an ONU 7 corresponding to its own to perform switching to the wavelength which is set for itself.

Figure 3:
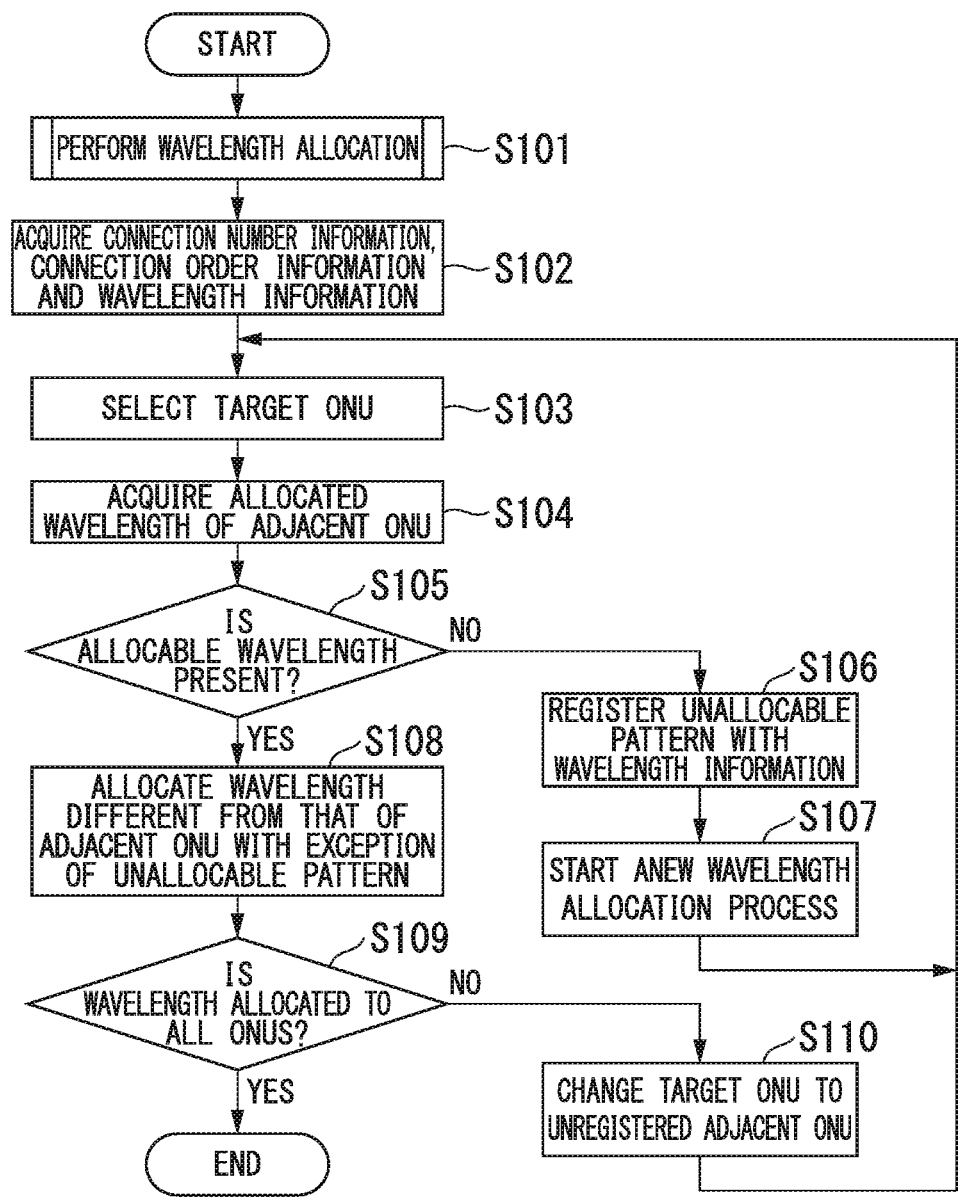
FIG. 3 is a flowchart illustrating a flow of processes in which the PON system of the first embodiment performs wavelength allocation on the basis of arrangement information of each ONU.

FIG. 3 is a flowchart illustrating of a flow of processes in which the PON system 200 of the first embodiment performs wavelength allocation on the basis of the arrangement information of each ONU 7. First, in an initial state, since the situation of the physical arrangement of each ONU 7 is unclear, the wavelength allocation calculation unit 111 allocates a wavelength to each ONU 7 through wavelength allocation calculation similar to the related art (step S101).

The connection order acquisition unit 108 generates the connection order information on the basis of the arrangement information which is obtained in the situation of communication at the wavelength allocated in step S101. The wavelength allocation calculation unit 111 acquires the connection order information and the connection number information from the connection order acquisition unit 108, the connection number information acquisition unit 109 and the wavelength information storage unit 110 (step S102).

The wavelength allocation calculation unit 111 selects any one of the ONUs 7 as a target for wavelength allocation (hereinafter, referred to as a "target ONU") from among the ONUs 7 connected to the OLT (step S103). The wavelength allocation calculation unit 111 acquires wavelength information of an ONU 7 adjacent to the selected target ONU (hereinafter, referred to as an "adjacent ONU") from the wavelength information storage unit 110 (step S104). An adjacent ONU is an ONU 7 immediately before the target ONU and an ONU 7 immediately after the target ONU, in the order of the ONUs 7 indicated by the connection order information.

The wavelength allocation calculation unit 111 determines whether a wavelength can be allocated to the target ONU without coinciding with wavelengths allocated to two adjacent ONUs on the basis of the acquired wavelength information of the adjacent ONU (step S105). In a case where a wavelength cannot be allocated to the target ONU without coinciding with the wavelengths of the adjacent ONUs (step S105: NO), the wavelength allocation calculation unit 111 registers a case where a wavelength without coinciding with wavelengths of the adjacent ONUs cannot be allocated (hereinafter, referred to as an "unallocable pattern") to the target ONU in the wavelength information stored in the wavelength information storage unit 110 (step S106). The wavelength allocation calculation unit 111 returns the process to step S103, and starts afresh a wavelength allocation process for ONUs 7 without the exception of the unallocable pattern (step S107).

In a case where a wavelength can be allocated to the target ONU without coinciding with those of the adjacent ONUs (step S105: YES), the wavelength allocation calculation unit 111 allocates the wavelength to the target ONU (step S108).

The wavelength allocation calculation unit 111 determines whether wavelength allocation has been performed for all of the ONUs 7 (step S109). In a case where wavelength allocation has been performed for all of the ONUs 7 (step S109: YES), the wavelength allocation calculation unit 111 terminates the wavelength allocation process for the ONUs 7. In a case where wavelength allocation has not been performed for any of the ONUs 7 (step S109: NO), the wavelength allocation calculation unit 111 changes the target ONU to an adjacent ONU which is not registered with the wavelength information (step S110), and returns the process to step S103 to execute the wavelength allocation process for another ONU 7.

In a case where a result of termination of the wavelength allocation process for all of the ONUs 7 indicates that different wavelengths are not allocated to the adjacent ONUs 7, the wavelength allocation calculation unit 111 calculates an allocation pattern so as to minimize the number of cases where the same wavelength is allocated to the adjacent ONUs 7, and outputs the calculated allocation pattern as a result of the wavelength allocation process.

In the PON system 200 of the first embodiment configured in this manner, the traffic monitoring unit 107 monitors uplink signals or downlink signals received by each OSU 103. Since a high-speed moving object moves along a railroad track, a road or the like, the data traffic of each OSU 103 shows transition in accordance with the movement of the high-speed moving object. That is, the transition of the data traffic of each OSU 103 is considered to indicate the physical arrangement of each ONU 7. Therefore, the traffic monitoring unit 107 outputs information indicating such transition of the data traffic as arrangement information to the connection order acquisition unit 108. The connection order acquisition unit 108 generates connection order information indicating the order of physical connection of the ONUs 7 on the basis of the transition of data traffic indicated by the arrangement information.

The wavelength allocation calculation unit 111 can identify the physical arrangement of the ONUs 7 on the basis of the connection order information generated in this manner and the connection number information indicating the number of ONUs 7 connected to the OLT. The wavelength allocation calculation unit 111 performs wavelength allocation for each ONU 7 so that different wavelengths are allocated to the adjacent ONUs 7, on the basis of the physical arrangement of the ONUs 7 identified in this manner.

Figure 4:
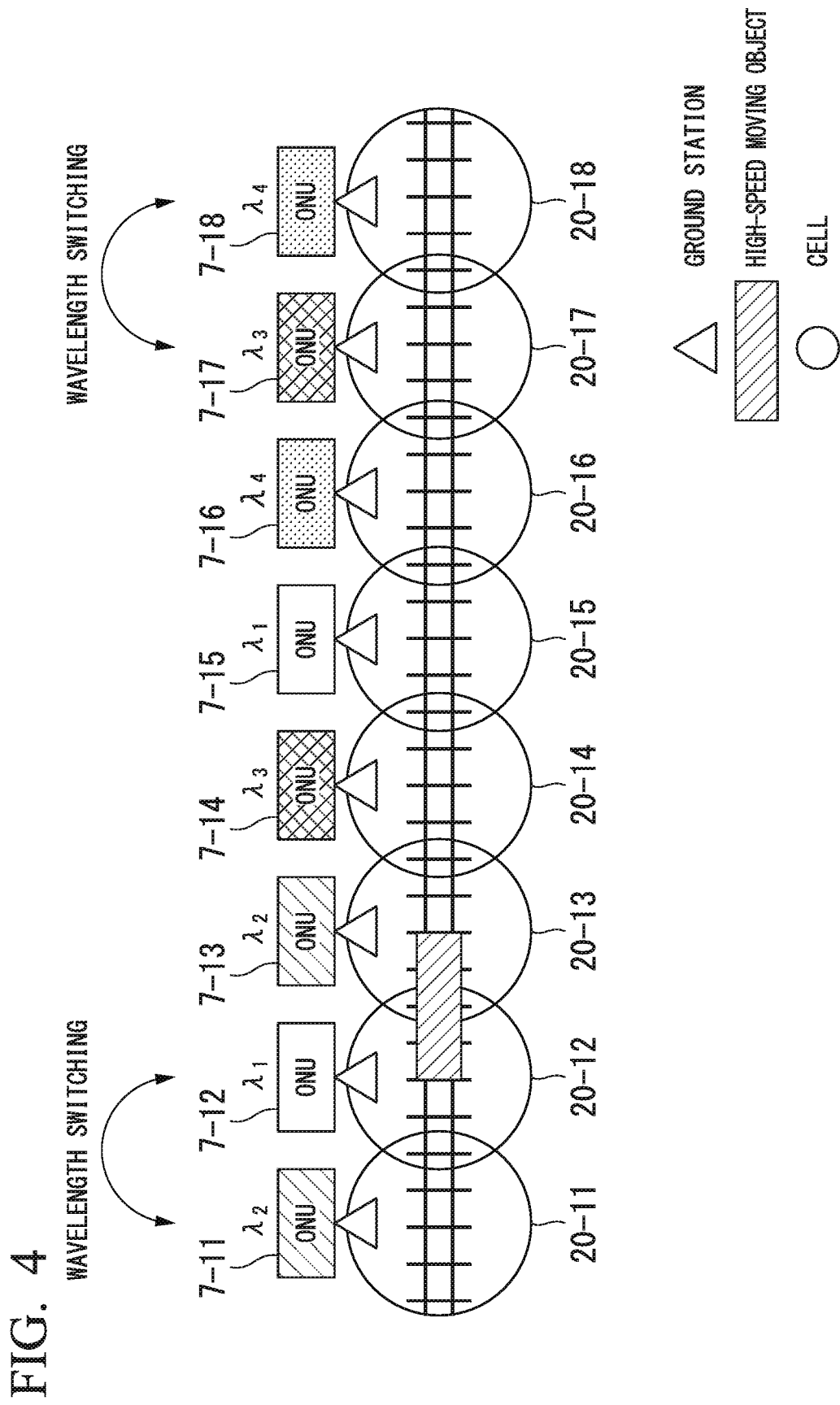
FIG. 4 is a diagram illustrating an operation example of wavelength allocation in the PON system of the first embodiment.
Figure 9:
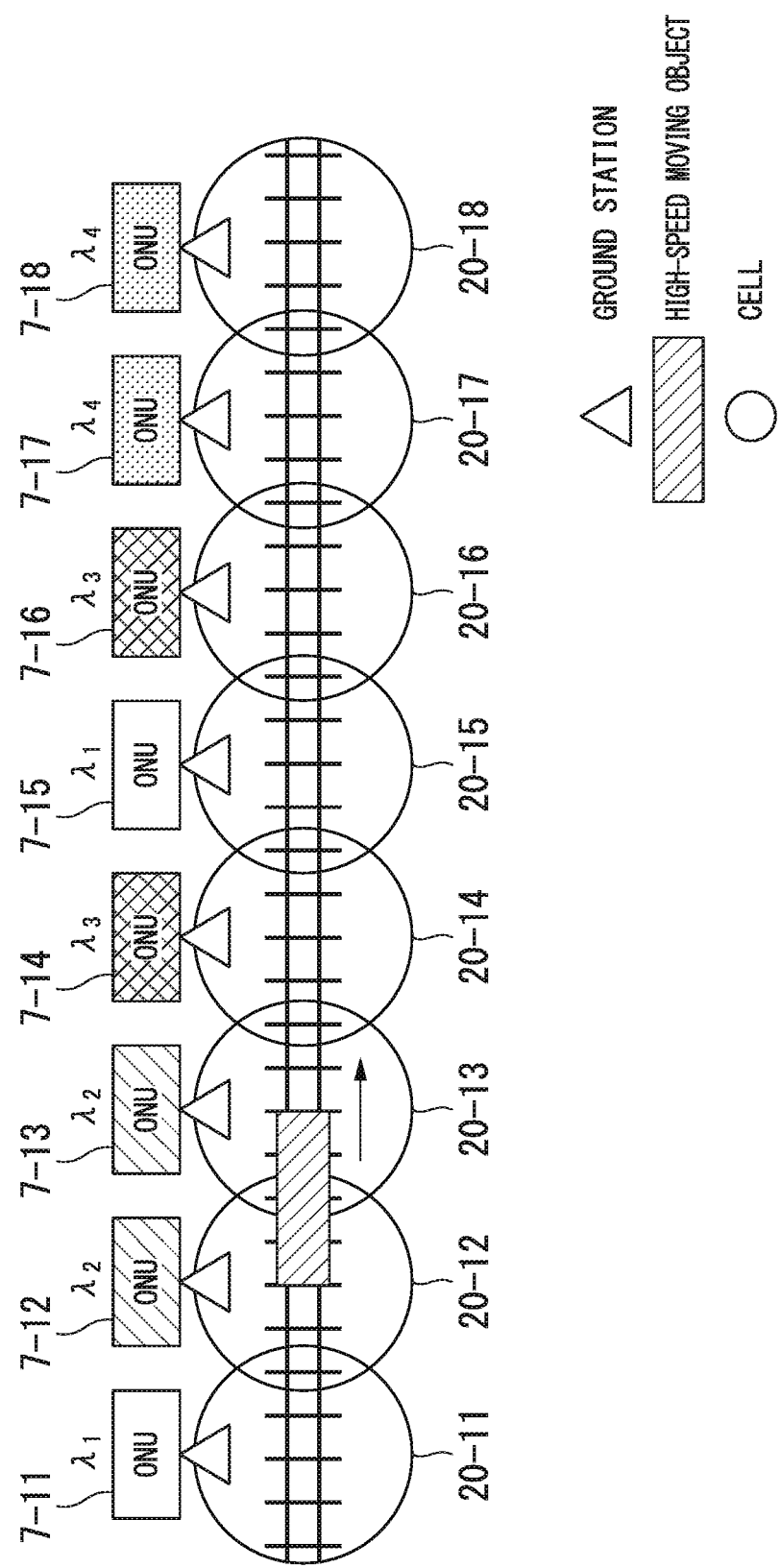
FIG. 9 is a diagram illustrating a specific example of a wavelength allocation result obtained using a method in the related art with respect to each ONU corresponding to a respective cell in a mobile network in which a plurality of ground stations and a higher-level device are connected to each other through a WDM-PON.

FIG. 4 is a diagram illustrating an operation example of wavelength allocation in the PON system 200 of the first embodiment. A case is assumed in which wavelength allocation using a method in the related art in an initial state is performed as in the example shown in FIG. 9. In the initial state, the same wavelength $\lambda_2$ is allocated to adjacent ONUs 7-12 and 7-13, and the same wavelength $\lambda_4$ is allocated to adjacent ONUs 7-17 and 7-18.

In this case, wavelength allocation using the method of the present embodiment is performed, and thus wavelength switching for the adjacent ONUs 7-12 and 7-13 and wavelength switching for the adjacent ONUs 7-17 and 7-18 are performed. As shown in the example of FIG. 4, a wavelength $\lambda_2$ is allocated to ONUs 7-11 and 7-13, a wavelength $\lambda_1$ is allocated to ONUs 7-12 and 7-15, a wavelength $\lambda_3$ is allocated to ONU 7-14 and 7-17, and a wavelength $\lambda_4$ is allocated to ONUs 7-16 and 7-18. In this manner, wavelength allocation is performed using the method of the present embodiment, whereby different wavelengths can be allocated to each pair of the adjacent ONUs 7. Therefore, in the PON system 200 of the first embodiment, traffic concentrates only on optical communication of a specific wavelength, and it is possible to prevent a decrease in throughput from occurring.

Modification Example

Figure 5:
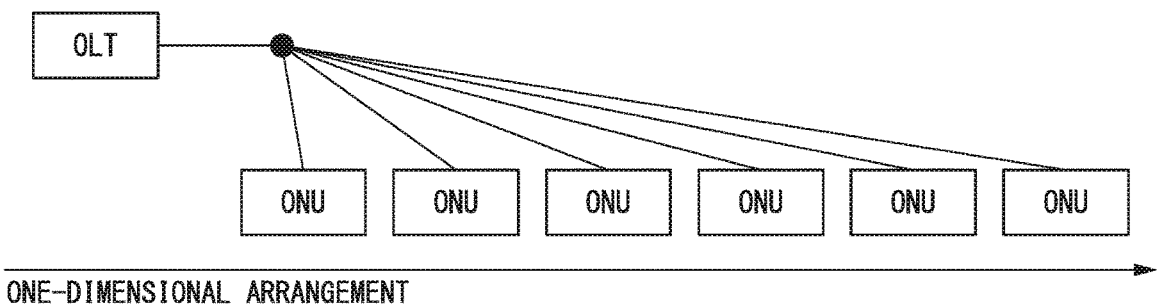
FIG. 5 is a diagram illustrating a specific example of the physical arrangement of ONUs.

Although it has been described as an example in the above embodiment that information (connection order information) indicating the physical connection order of the ONUs 7 is generated on the basis of the transition of traffic, a method of generating the connection order information is not limited to this example. The connection order information may be stored in advance in the OLT 100. In this case, the connection order information may be manually updated in accordance with the installation of the ONU 7. In addition, the connection order information may be generated on the basis of a round trip time (RTT) between the OLT and the ONU. FIG. 5 is a diagram illustrating a specific example of the physical arrangement of the ONUs 7. As shown in FIG. 5, in a case where the ONUs 7 are arranged one-dimensionally in the traveling direction of a high-speed moving object with the OLT 100 as its starting point, the physical connection order of the ONUs 7 can be identified by the length of the RTT between the OLT 100 and each ONU 7. This is because the RTT generally correlates with a distance between the OLT 100 and each ONU 7.

The wavelength allocation calculation unit 111 may allocate a wavelength which is next longest or shortest after a wavelength currently set in another ONU 7 adjacent to an ONU 7 among wavelengths capable of being set in the ONU 7 to the ONU 7. Wavelength allocation is performed using such a method, and thus it is possible to shorten the sweep time of wavelength allocation to the ONU 7.

Second Embodiment

In the operation of a WDM-PON system, there is the possibility that a new ONU is added to the WDM-PON system. In a case where a wavelength allocation method of the first embodiment is applied when a new ONU is added, wavelength allocation is also performed on an ONU 7 in which traffic occurs. As a result, there is the possibility that switching of a wavelength occurs on the ONU, and a communication delay or a decrease in throughput may occur due to suspension of transmission and reception in the meantime. Therefore, a PON system 200 of a second embodiment executes a second wavelength allocation process different from that in the first embodiment as interrupt processing when a new ONU 7 is added. The configuration of the PON system 200 of the second embodiment is the same as that of the PON system 200 of the first embodiment.

Figure 6:
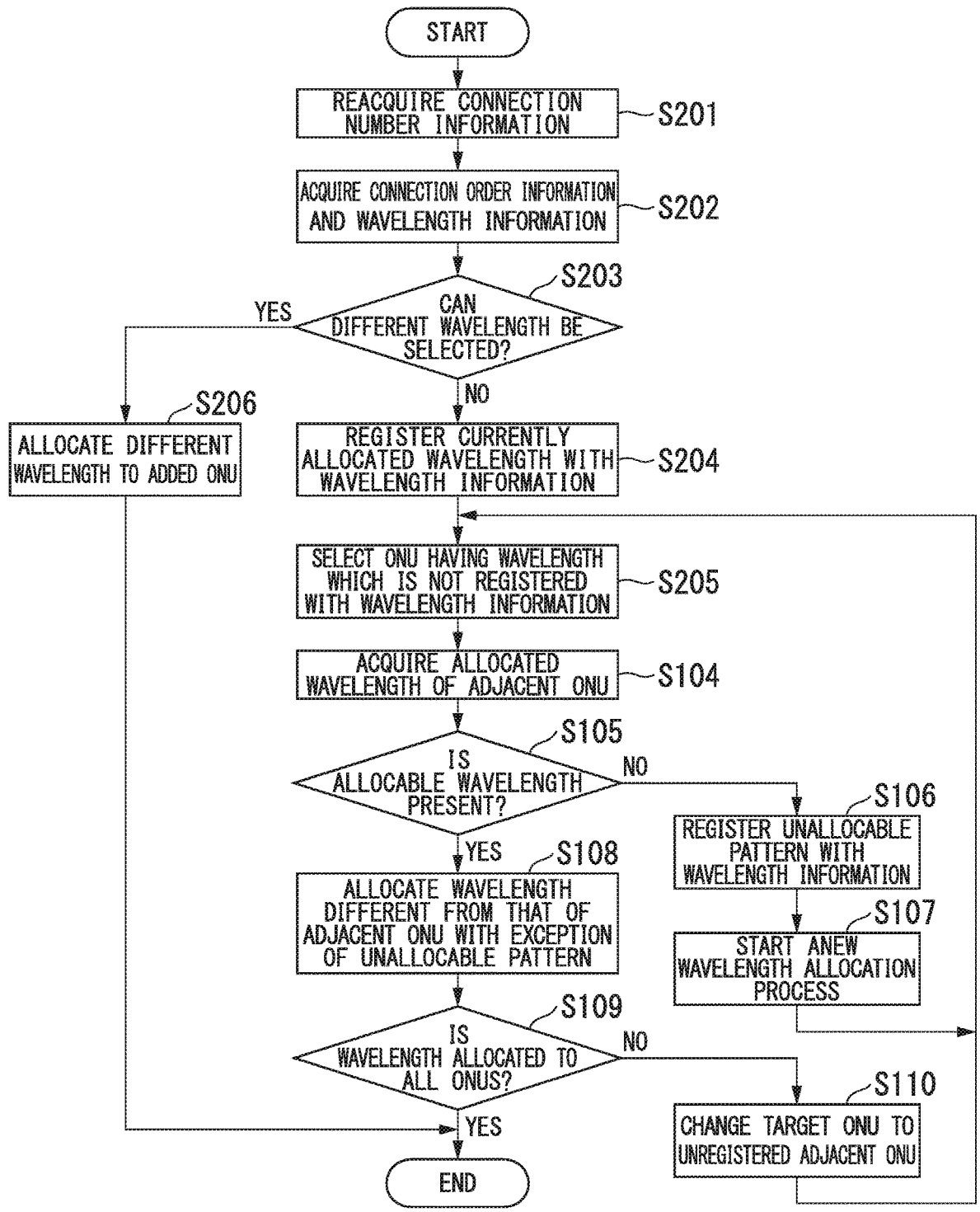
FIG. 6 is a flowchart illustrating of a flow of a second wavelength allocation process which is performed by a PON system of a second embodiment when an ONU is added.
Figure 7:
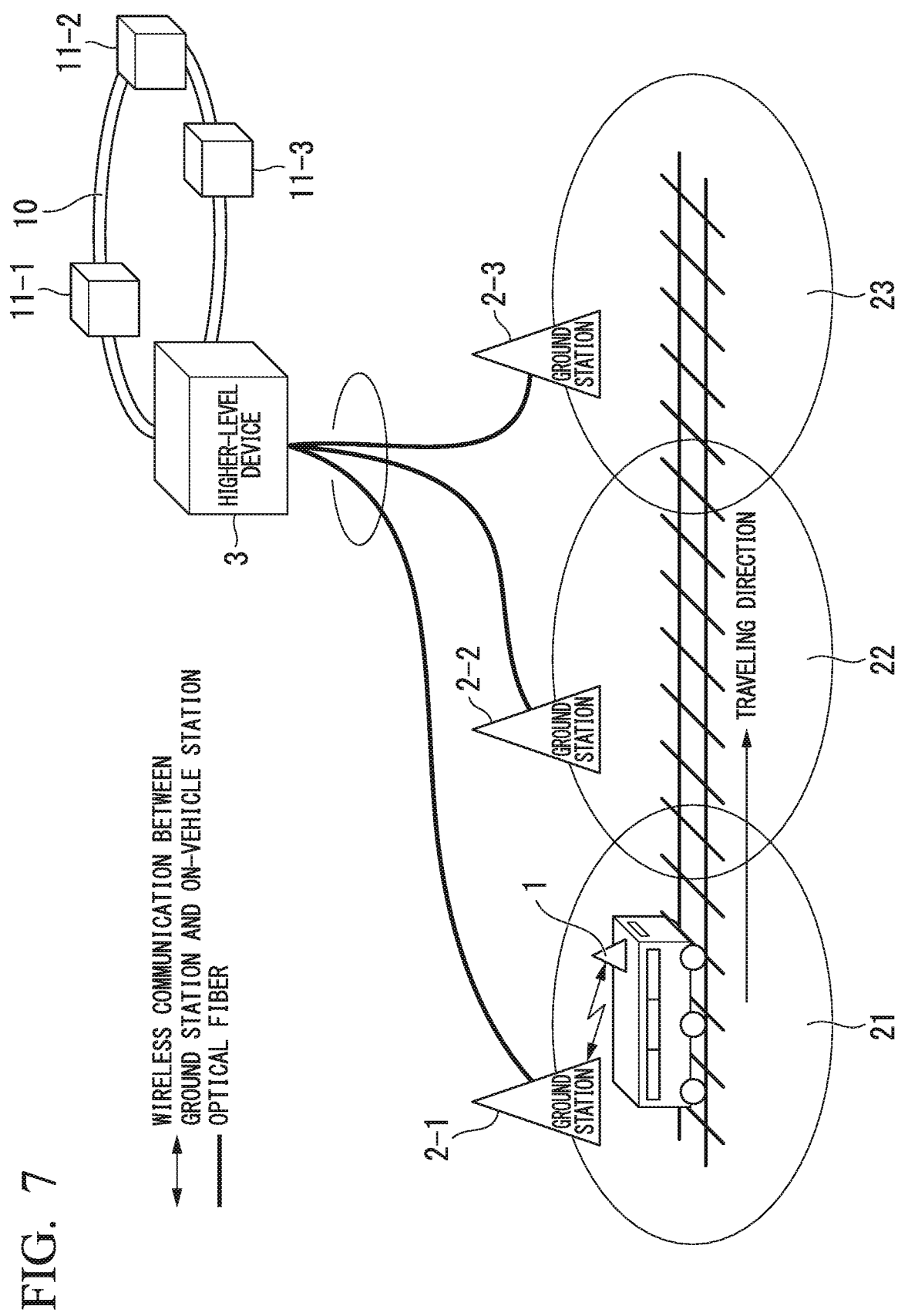
FIG. 7 is a schematic diagram illustrating a specific example of a mobile network in the related art.
Figure 8:
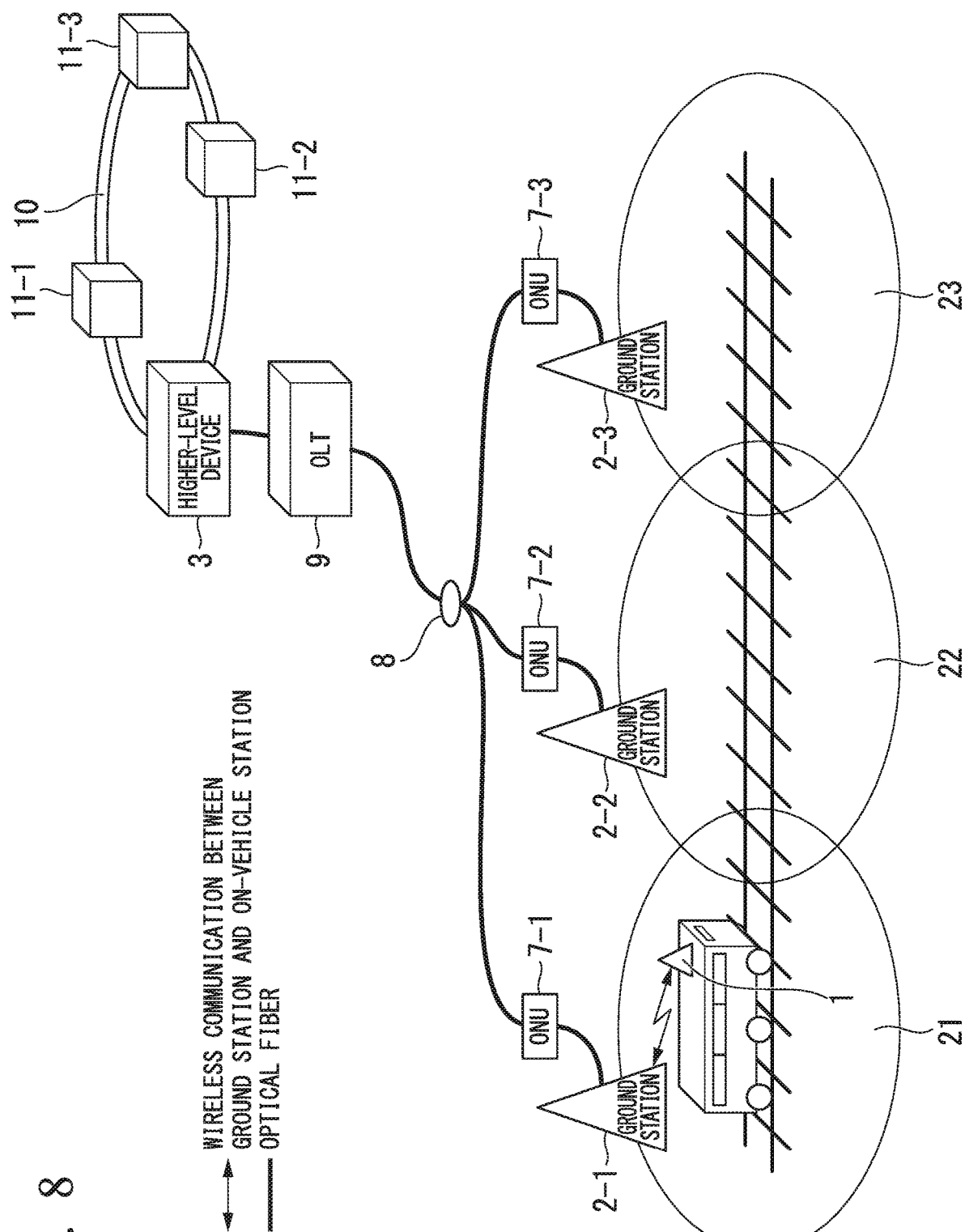
FIG. 8 is a schematic diagram illustrating a specific example of a mobile network constituted by an extended PON system in the related art.

FIG. 6 is a flowchart illustrating a flow of a second wavelength allocation process which is performed by the PON system 200 of the second embodiment when an ONU 7 is added. The same processes in FIG. 6 as those in FIG. 3 are denoted by the same reference numerals and signs, and thus the description thereof will be omitted.

The second wavelength allocation process is executed as interrupt processing when an ONU 7 is added. The connection number information acquisition unit 109 reacquires connection number information (step S201). The connection number information acquisition unit 109 outputs the reacquired connection number information to the wavelength allocation calculation unit 111. The wavelength allocation calculation unit 111 acquires connection order information and wavelength information (step S202).

The wavelength allocation calculation unit 111 determines whether different wavelengths can be allocated to the added ONU 7 (hereinafter, referred to as an "added ONU") and its adjacent ONU (step S203). In a case where different wavelengths cannot be allocated to the added ONU and its adjacent ONU (step S203: NO), the wavelength allocation calculation unit 111 registers the currently allocated wavelength with the wavelength information to the ONU 7 in which the transmission and reception of signals are being performed (step S204). The wavelength allocation calculation unit 111 selects any one of the ONUs 7 as the target ONU from among ONUs 7 which are not registered with the wavelength information (step S205).

In step S203, in a case where different wavelengths can be allocated to the added ONU and its adjacent ONU (step S203: YES), the wavelength allocation calculation unit 111 allocates the allocable different wavelength to the added ONU (step S206).

In the PON system 200 of the second embodiment configured in this manner, in a case where the addition of an ONU 7 is performed, the wavelength allocation calculation unit 111 determines whether a wavelength different from that of its adjacent ONU can be allocated to the added ONU. In a case where a different wavelength can be allocated, the wavelength allocation calculation unit 111 allocates the different wavelength to the added ONU. In a case where a different wavelength cannot be allocated, the wavelength allocation calculation unit 111 registers in the wavelength information new allocation without changing the wavelength currently allocated to an ONU 7 in which traffic occurs. The same wavelength allocation as that in the first embodiment is performed for an ONU 7 which is not registered with the wavelength information as the target ONU. The wavelength allocation calculation unit 111 executes such a second wavelength allocation process as interrupt processing during the addition of an ONU 7, and thus it is possible to prevent a wavelength from being switched in an ONU 7 in which traffic occurs.

Modification Example

The wavelength allocation calculation unit 111 may be configured to make a transition to a state (stopped state) in which all or some of the functions of an ONU 7 which is not used are not brought into operation, on the basis of the traffic information. The OLT 100 can reduce power consumption of the PON system 200 through such control.

The wavelength allocation calculation unit 111 may be configured to accommodate other services in the same WDM-PON, and to allocate to communication of other services redundant wavelengths which are not used among wavelengths capable of being allocated to the ONU 7. The term "service" as used herein means a service which is realized by the PON system 200. For example, a service which is realized by the PON system 200 of the present embodiment is a mobile network shown in FIG. 1. In that sense, an example of other services includes a service such as fiber to the home (FTTH) or machine to machine (M2M) intended for the mass.

The wavelength allocation method of the above embodiment can also be applied to a WDM/TDM-PON in which both a WDM-PON and a TDM-PON are combined.

The OLT 100 in the above-described embodiment may be realized by a computer. In that case, a program for realizing this function may be recorded in a computer readable recording medium, and be realized by causing a computer system to read and execute the program recorded in this recording medium. The term "computer system" as used herein is assumed to include an OS or hardware such as peripheral devices. In addition, the term "computer readable recording medium" refers to a portable medium such as a flexible disk, a magneto-optic disc, a ROM, or a CD-ROM, and a storage device such as a hard disk built into the computer system. Further, the "computer readable recording medium" may also include recording mediums that dynamically hold a program during a short period of time like networks such as the Internet or communication lines when a program is transmitted through communication lines such as a telephone line, and recording mediums that hold a program for a certain period of time like a volatile memory inside a computer system serving as a server or a client in that case. The above-mentioned program may be a program which is used for realizing a portion of the aforementioned functions, may be a program which is capable of realizing the aforementioned functions by a combination of programs previously recorded in the computer system, and may be a program which is realized using a programmable logic device such as a field programmable gate array (FPGA).

Hereinbefore, the embodiments of the present invention have been described in detail with the accompanying drawings, but specific configurations are not limited to these embodiments, and may also include a design and the like without departing from the scope of the present invention.

INDUSTRIAL APPLICABILITY

The present invention can be applied to a passive optical network (PON).

REFERENCE SIGNS LIST

1 On-vehicle station
2, 2-1 to 2-3 Ground station
3 Higher-level device
7, 7-1 to 7-18 Optical network unit (ONU)
8 Optical coupler
9 Optical line terminal (OLT)
10 Higher-level network
11-1 to 11-3 Communication device
20-11 to 20-18, 21, 22, 23 Cell
100 OLT
101, 101-1, 101-2 First input and output unit
102 Second input and output unit
103, 103-1 to 103-$n$ Optical subscriber unit (OSU)
104 Multiplexing/demultiplexing unit
105 Wavelength allocation unit
106 Control signal receiving unit
107 Traffic monitoring unit
108 Connection order acquisition unit 109 Connection number information acquisition unit
110 Wavelength information storage unit
111 Wavelength allocation calculation unit
112 Wavelength switching instruction signal generation unit
113 Control signal transmission unit
200 Passive optical network (PON) system

The invention claimed is:

1. An optical transmission system which connects a plurality of wireless communication systems to each other, the optical transmission system comprising:
- a traffic monitor that monitors traffic of optical-terminating devices connected to respective ones of the plurality of wireless communication systems during a terminal device moving among communicable range of the plurality of wireless communication systems;
- a connection order acquisitor that estimates a physical arrangement of the optical-terminating devices on a basis of transition of the traffic of the optical-terminating devices; and
- a wavelength allocator that allocates different wavelengths to the optical-terminating devices to which the wireless communication systems next to each other are connected, on a basis of the physical arrangement of the optical-terminating devices.

2. An optical transmission system which connects a plurality of wireless communication systems to each other, the optical transmission system comprising:
- a traffic monitor that acquires traffic information relating to traffic of each of the plurality of wireless communication systems;
- a connection order acquisitor that estimates a physical arrangement of the optical-terminating devices on a basis of the traffic information;
- a connection number information acquisitor that acquires connection number information indicating the number of optical-terminating devices connected to the wireless communication systems;
- a wavelength information storage unit that stores wavelength information indicating information of a wavelength allocated to each of the optical-terminating devices which is connected to a respective one of the plurality of wireless communication systems; and
- a wavelength allocator that allocates different wavelengths to optical-terminating devices to which the wireless communication systems next to each other are connected, on a basis of the physical arrangement of the optical-terminating devices.

3. The optical transmission system according to claim 2, further comprising a registration unit that registers arrangement information indicating the physical arrangement of the optical-terminating devices estimated by the connection order acquisitor with an optical terminal station device included in the optical transmission system.

4. The optical transmission system according to claim 2 wherein the connection order acquisitor estimates the physical arrangement of the optical-terminating devices on a basis of a distance between the optical terminal station device and each of the optical-terminating devices.

5. The optical transmission system according to claim 1, wherein the wavelength allocator estimates one optical-terminating device of the optical-terminating devices, which does not generate traffic, on a basis of traffic information of a terminal device that moves among the plurality of wireless communication systems, and makes the estimated one optical-terminating device transition to a stopped state.

6. The optical transmission system according to claim 1, wherein the wavelength allocator allocates, to one of the optical-terminating devices, a wavelength which is next longest or shortest after a wavelength currently allocated to another one of optical-terminating devices adjacent to the one among wavelengths capable of being allocated to the optical-terminating devices.

7. A wavelength allocation method which is performed by an optical transmission system which connects a plurality of wireless communication systems to each other, the wavelength allocation method comprising:
- a step of monitoring traffic of optical-terminating devices connected to respective ones of the plurality of wireless communication systems during a terminal device moving among communicable range of the plurality of wireless communication systems;
- a step of estimating a physical arrangement of the optical-terminating devices on a basis of transition of the traffic of the optical-terminating devices; and
- a step of allocating different wavelengths to optical-terminating devices to which the wireless communication systems next to each other are connected, on a basis of the physical arrangement of the optical-terminating devices.

8. The optical transmission system according to claim 2, wherein the wavelength allocator estimates one optical-terminating device of the optical-terminating devices, which does not generate traffic, on a basis of traffic information of a terminal device that moves among the plurality of wireless communication systems, and makes the estimated one optical-terminating device transition to a stopped state.

9. The optical transmission system according to claim 2, wherein the wavelength allocator allocates, to one of the optical-terminating devices, a wavelength which is next longest or shortest after a wavelength currently allocated to another one of optical-terminating devices adjacent to the one among wavelengths capable of being allocated to the optical-terminating devices.

* * * * *